June 7, 1960
J. A. KOZEL ET AL
2,939,927
PRESSURE SWITCH
Filed June 21, 1956
2 Sheets-Sheet 1
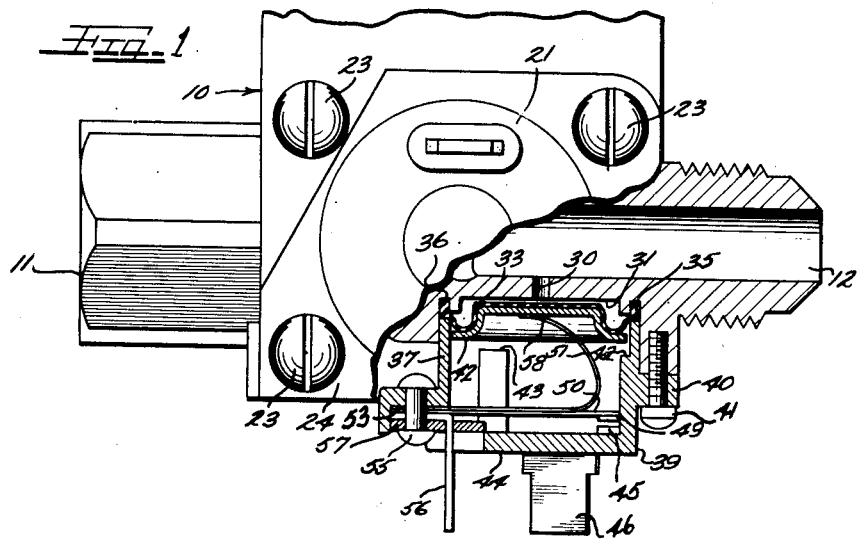
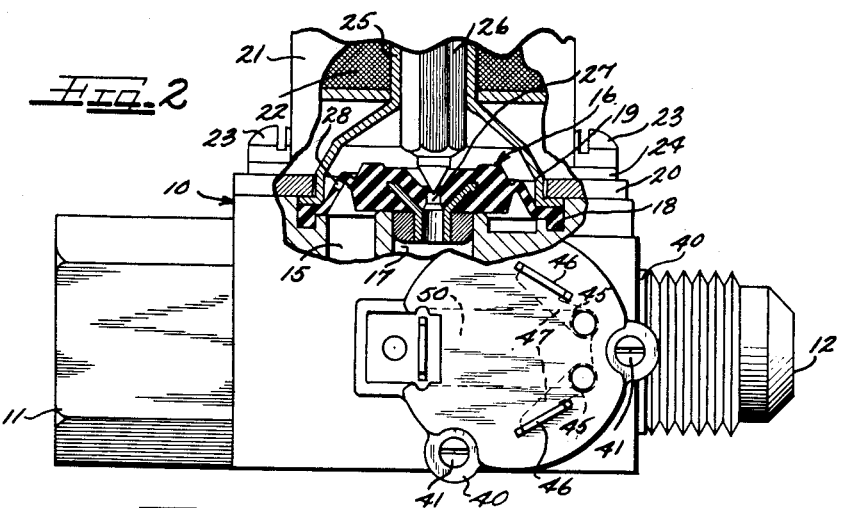
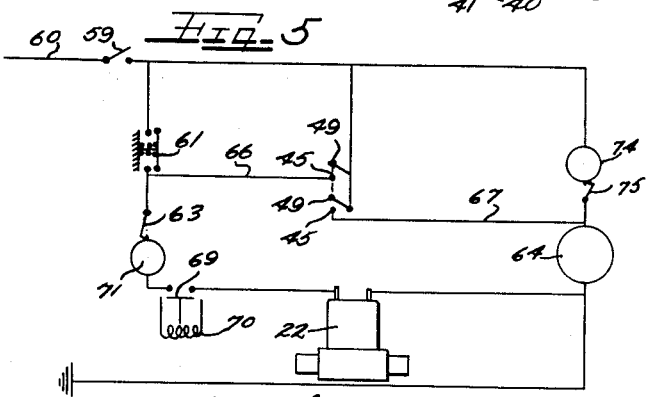
Inventors
JAMES A. KOZEL
VICTOR E. RIMSHA
RICHARD H. POWELL
By Hill, Sherman, Meroni, Gross & Simpson Attys June 7, 1960
J. A. KOZEL ET AL
2,939,927
PRESSURE SWITCH
Filed June 21, 1956
2 Sheets-Sheet 2
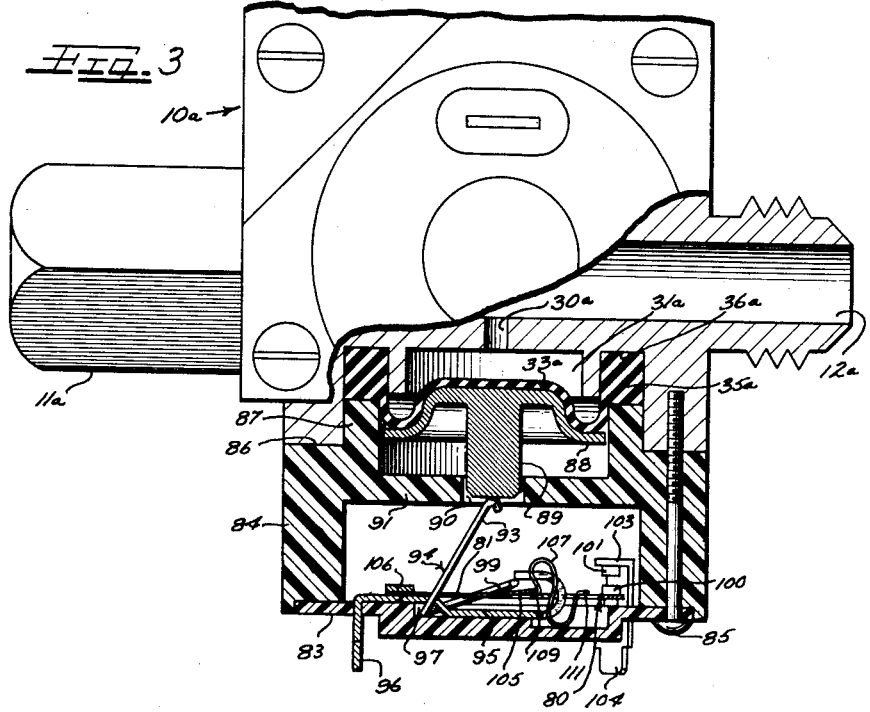
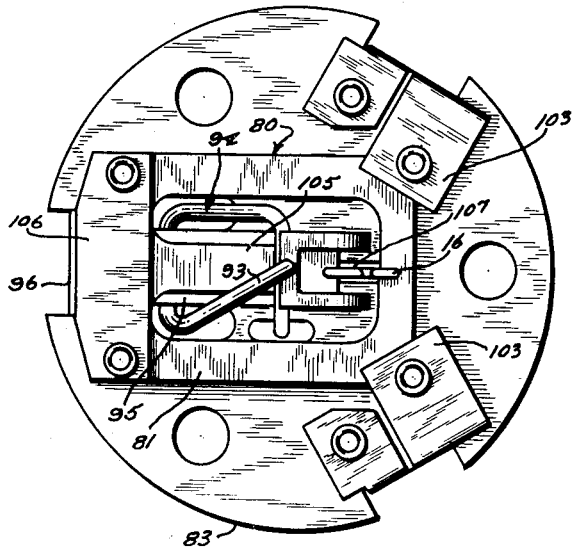
Inventors
JAMES A. KOZEL
VICTOR E. RIMSHA
RICHARD H. POWELL
By Hill, Sherman, Meroni, Gross & Simpson Attys

# United States Patent Office 2,939,927
Patented June 7, 1960

2,939,927

PRESSURE SWITCH

James A. Kozel and Victor E. Rimsha, Chicago, and Richard H. Powell, Lake Zurich, Ill., assignors to The Dole Valve Company, Chicago, Ill., a corporation of Illinois Filed June 21, 1956, Ser. No. 592,869

2 Claims. (Cl. 200—83)

This invention relates to improvements in electrically operated control switches for electrically operated valves.

A principal object of the invention is to provide a simple form of pressure switch controlling an energizing circuit operating in response to a predetermined reduction in the flow of water to a device to be operated.

A further and important object of the invention is to provide a non-chattering pressure switch for incorporation in an electrically controlled valve and the like, providing a positive contact upon the passage of fluid under pressure through the valve and effecting the deenergization of an energizing circuit holding the valve open at water pressures determined by the operating condition with which the valve is used.

A still further object of the invention is to provide a simple from of diaphragm operated pressure switch in which the drive member from the diaphragm to the switch consists in a leaf spring arranged to prevent breaking of the contacts of the switch as long as there is a predetermined pressure on the diaphragm for operating the switch.

These and other objects of the invention will appear from time to time as the following specification proceeds and with reference to the accompanying drawings wherein:

Figure 1 is a fragmentary plan view of a pressure operated electrically controlled valve with parts of the valve body broken away and other parts shown in section and showing a pressure switch in association with the outlet from the valve;

Figure 2 is a view in side elevation of the valve shown in Figure 1 with certain parts broken away and certain other parts shown in section, in order to illustrated the solenoid controlled diaphragm operated valve, controlling the flow of fluid from the inlet to the outlet from the valve;

Figure 3 is a plan view of a valve somewhat similar to Figure 1, with certain parts broken away and certain other parts shown in section, and showing a modified form in which our invention may be embodied;

Figure 4 is a detail plan view of the snap action switch shown in Figure 3; and

Figure 5 is a circuit diagram illustratively showing a form of electrical control circuit controlled by the valve and pressure switch constructed in accordance with our invention.

In the embodiment of the invention illustrated in the drawing, a valve is shown as comprising a valve body 10 having an inlet 11 and an outlet 12. The inlet 11 leads to an annular passageway 15 opening to a side of the valve body and closed by a pressure operated solenoid controlled diaphragm valve 16 controlling the flow of fluid, such as water through a port 17, shown as being concentric with the annular passageway 15 and communicating with the outlet 12.

The diaphragm valve 16 is shown as having sealing engagement at its periphery with the open end portion of the valve body in an annular groove 18 formed in said valve body around the annular passageway 15. A closure cap 19 abuts the outer side of the diaphragm valve 16 adjacent the outer margin thereof and may be secured to the valve body by a yoke 20, abutted by a casing 21 for a solenoid 22, and secured to the valve body 10 by machine screws 23 extending through a flange 24 for said casing and the yoke 20, and threaded within said valve body.

The closure cap 19 has an armature guide 25 extending therefrom within the coil of the solenoid and having an armature 26 guided therein. The armature 26 is biased into engagement with a central orifice 27 leading through the diaphragm valve 16 when the coil for the solenoid 22 is deenergized. The diaphragm valve 16 has the usual bleeder passageway 28 extending therethrough, to pass water from one side of the diaphragm to the other and create a pressure differential on opposite sides of said diaphragm valve when the central orifice 27 is closed by the armature 26, to maintain the valve closed by pressure as long as said armature is in engagement with said central orifice. Upon energization of the coil 22 for the solenoid, the armature 26 will move out of engagement with the central orifice 27, relieving pressure from the outer side of the diaphragm valve 16 and effecting opening of said valve by the pressure of fluid acting on the under side of said diaphragm valve, as is well known to those skilled in the art, so not herein shown or described further.

The outlet 12 has a passageway 30 leading therefrom at right angles thereto and having communication with a cavity 31 opening to the outside of the valve body and closed by a diaphragm 33. The diaphragm 33 has an annular rib 35 extending thereabout and sealed into engagement with an annular groove 36 extending about the cavity 31, by an annular wall 37 of a switch body 39. The switch body 39 has a plurality of ears 40 projecting therefrom, through which extend machine screws 41, threaded within the valve body 10 and maintaining the annular wall 37 into engagement with the annular rib 35 of the diaphragm 33 and sealing said diaphragm to the cavity 31.

The diaphragm 33 is abutted at its outer side by a generally dish-shaped diaphragm guide 42, recessed inwardly from the outer side thereof to generally conform to the form of the diaphragm 33 and guiding the diaphragm for movement along the wall 37 and limiting movement of said diaphragm along said wall by engagement with stop ledges 43 extending inwardly from said wall.

The switch body 39 has an outer or top wall 44, shown as having spaced contacts 45 extending inwardly therefrom connected with terminal leads 46 by contact bars 47. The spaced contacts 45 are adapted to be engaged by contacts 49 on the end of a resilient movable contact arm 50, extending across the interior of the switch body 39 in inwardly spaced relation with respect to the top wall 44.

The contact arm 50 is shown as being abutted at its under side by a leaf spring 51 extending therealong for a greater part of the length thereof. The contact arm 50 and leaf spring 51 extend along a shouldered portion 53 of the switch body 39 outwardly of the wall 37 and are secured to said shouldered portion of said valve body as by a rivet 55 extending through the shouldered portion of said valve body, the base of a terminal 56 and an insulating block 57 through which the terminal extends.

The leaf spring 51 forms an actuator for the contact arm 50 upon the application of pressure to the under side of the diaphragm 33 through the passageway 30 connected with the outlet 12 from the valve. As herein shown, the leaf spring 51 has a downwardly and inwardly curved end portion 58 extending inwardly along the hollow interior of the switch body 39 and having slidable engagement with the outer surface of the diaphragm guide 42. In the position of the contact arm 50 shown in Figure 1, substantially all load has been relieved from the spring and the contacts 49 and 45 are maintained open by the resiliency of the resilient movable contact arm 50.

The leaf spring 51 thus forms an actuator for the movable contact arm 50 and also exerts a yielding pressure on the contact arm 50, maintaining the contacts 49 in engagement with the contacts 45 regardless of variations in pressure above a predetermined minimum pressure on the diaphragm 33, and thus avoiding flutter or chattering of the contacts, with the resultant arcing and burning thereof, which would otherwise occur with a positive drive connection between the diagram and movable switch arm.

In the embodiment of the invention illustrated in Figures 3 and 4, we have shown a valve like the valve shown in Figures 1 and 2 in which the pressure operated diaphragm operates a snap action switch 80. Since the valve, valve body and diaphragm are similar to the valve, valve body and diaphragm shown in Figures 1 and 2, the description thereof need not be repeated and like parts will be designated by the same part numbers used in Figures 1 and 2 with the suffix a added to like part numbers.

The snap action switch 80 is shown as comprising a rectangular switch arm 81 open at its center and carried on a switch plate 83, closing an open end of a switch casing 84 and retained to said switch casing by machine screws 85 threaded within a body 10a for the valve. The switch casing 84 is shown as having an annular shoulder 86 abutting the end of a cavity 31a opening from the valve body 10a and having communication with said valve body through a pressure passageway 30a. The inner margin of the shoulder 86 is defined by an annular wall 87 engaging an annular rib 35a of a diaphragm 33a and maintaining said annular rib in sealing engagement with an annular groove 36a extending about the cavity 31a. The diaphragm 33a is abutted on its outer side by a diaphragm guide plate 88 having an integrally formed plunger 89 extending through and slidably guided in a guide aperture 90 in an inner wall 91 of the switch casing 84. The plunger 89 has engagement at its outer end with an arm 93 of an actuator lever 94, retained to the switch plate 83 for pivotal movement with respect thereto by an inwardly extending arm 95 of a terminal 96 leading through the switch plate 83 and extending along the inner side thereof.

As herein shown, the actuator lever 94 has a right angled portion which extends along a shouldered portion 97 of the switch plate 83. The arm 95 extends angularly downwardly over the right angled portion of the actuator lever 94 and then along the inner face of the switch plate 83 toward the opposite end thereof from the terminal 96 and curves inwardly and backwardly at its inner end. The inside of the backwardly curved inner end portion of the arm 95 abuts an arm 99 of the actuator lever 94 and limits movement thereof in a direction to disengage movable contacts 100 of the switch arm 81 from stationary contacts 101 of the switch. The stationary contacts 101 are shown as being mounted on the inturned ends 103 of switch terminals 104, herein shown as being spade terminals and leading through the switch plate 83.

The arm 99 of the actuator lever 94 extends over and engages a spring arm 105 of the switch arm 81, extending along the center of the open portion of the switch arm 81 for a portion of the length thereof. The switch arm 81 is abutted by a retainer plate 106 at its end opposite the contacts 100 and is retained in abutting engagement with the inner side of the arm 95 as by rivets or the like, which also secure the arm 95 to the switch plate 83.

The spring arm 105 is biased oppositely from the switch arm 81 by an over center spring 107, herein shown as being generally S shape in form and having one outturned end 109 engaging under the end of the spring arm 105 and an opposite, oppositely facing outturned end 111 engaging the switch arm 81 between the contacts 100 thereof. The spring 107 acting as an over center spring will effect the snapping of the contacts 100 into engagement with the stationary contacts 101 upon depression of the spring arm 105, effecting movement of the plunger 89 inwardly of the switch casing 84. The over center spring 107 will also snap the contacts 101 out of engagement with the stationary contacts 101 upon the release of pressure from the spring arm 105.

It should here be understood that while we have herein shown the actuator lever 94 as operating the snap acting switch, that if desired a direct drive connection may be provided from the plunger 89 or diaphragm 33a to the spring arm 105, to operate the switch.

In Figure 5 we have shown a circuit diagram for a dishwasher or like apparatus having a door switch 59 which closes upon closing of the door (not shown) of the dishwasher to complete a circuit from a conductor 60 to a push button switch 61 which momentarily closes as pressure is applied thereto, to complete a circuit through a cam operated timer switch 63 operated by a timer motor 64. The cam operated timer switch 63 is normally closed to energize the solenoid coil 22 and withdraw the armature 26 from the central orifice 27 passing through the diaphragm valve 16, to effect opening of said diaphragm valve by pressure acting on the underside thereof.

As the diagram valve 16 is opened, the pressure of water passing therethrough will pass through the passageway 30 into engagement with the underside of the diaphragm 33 and effect engagement of the contacts 49 on the movable contact arm 50 with the contacts 45, to maintain a holding circuit to the solenoid coil 22 through a conductor 66 connected with a contact 45 and the cam operated timer switch 63. A circuit will also be completed from the other stationary contact 45 through a conductor 67 to the timer motor 64 to energize said timer motor to start the cycle of operation of the dishwasher.

When the water filling cycle is completed, a switch 69 and measuring coil 70 will be opened by a cam 71 operating the cam operated timer switch 63, to deenergize the solenoid coil 22 and stop the filling operation. The solenoid 22 being deenergized, the armature 26 will move into engagement with the passageway 27 and effect closing of the diaphragm valve 16. This will relieve pressure from the diaphragm 33 and the leaf spring actuator 51 for the movable contact arm 50 and break the circuit between the contacts 49 and 45, locking the solenoid coil 22 out of the energizing circuit. At the same time, the timer motor 64 will have moved a timer cam 74 in position to close a circuit through a timer switch 75 operated by said timer cam, holding the timer motor energized until the completion of the dish washing cycle.

During the filling operation when the solenoid coil 22 is energized and the diaphragm valve 16 is open and contact is made between the stationary contacts 45 and movable contacts 49, if the pressure in the outlet 12 should drop to the extent where insufficient water could be supplied to the dishwasher to effect an efficient dish washing operation, the contacts 49 will move away from the contacts 45 by movement of the diaphragm 33 toward the bottom of the cavity 31. This will open the circuit to the solenoid 22 and the timing motor 64 and deenergize the entire circuit whenever the water supply is insufficient to efficiently effect a washing operation.

It may be seen from the foregoing that I have provided an efficient valve, particularly adapted for dishwashers and like devices, having two diaphragms, one of which serves as a shut-off valve for shutting off the flow of fluid through the valve and the other of which is actuated by pressure upon the application of pressure to the first diaphragm to open the valve, to effect closing of the valve upon insufficient flow through the valve to efficiently perform an operation, such as a washing operation and beside shutting off the flow through the valve may also deenergize the energizing circuit for carrying out a washing operation.

It will be understood that various modifications and variations of the present invention may be effected without departing from the spirit aid scope of the novel concepts thereof.

I claim as my invention:

1. A pressure switch operable by the flow of fluid through a valve and the like comprising a chamber, a diaphragm closing an end of said chamber, a wall closing an opposite end of said chamber and having a stationary contact thereon within said chamber, a resilient switch arm extending along said chamber in spaced relation with respect to said wall and fixedly secured at one end and having a contact at its opposite end, a leaf spring extending along said switch arm and fixed thereto at the fixed end thereof and turning downwardly and backwardly with respect to said switch arm adjacent the opposite end thereof, a guide plate generally conforming to the form of said diaphragm and guided for movement of said diaphragm within said chamber, means engageable with said guide plate for limiting movement of said guide plate and diaphragm within said chamber, and the backwardly turned end of said leaf spring having engagement with said guide plate and serving as actuating member for said movable contact arm for engaging said contact on said movable switch arm with said stationary contact and maintaining said contact on said movable switch arm in engagement with said stationary contact upon variations in pressure on said diaphragm.

2. A non-chattering pressure switch comprising a chamber having communication with a source of fluid under pressure, diaphragm means extending across an end of said chamber and acted on by fluid under pressure entering said chamber, a stationary contact within said chamber, a resilient movable switch arm within said chamber, fixed at one end and having a contact on its opposite end, registrable with said stationary contact and biased out of engagement with said stationary contact, and a leaf spring extending along said switch arm for substantially the length thereof and extending inwardly therefrom from a position adjacent the contact of said switch arm and turned backwardly in an arcuate path into engagement with said diaphragm means, and forming an actuating member for moving said switch arm to engage the contact thereon with said stationary contact upon the application of said fluid under pressure to said diaphragm means and movement of said diaphragm means inwardly along said chamber, and yieldably maintaining said contact on said movable switch arm in engagement with said stationary contact and preventing chattering of said contacts upon variations in fluid pressure on said diaphragm means.

References Cited in the file of this patent

UNITED STATES PATENTS

| | | |
|---|---|---|
| 891,568 | Runnion | June 23, 1908 |
| 895,426 | Cable | Aug. 11, 1908 |
| 926,389 | Collin | June 29, 1909 |
| 1,081,693 | Parker | Dec. 16, 1913 |
| 2,644,476 | Smith | July 7, 1953 |
| 2,647,968 | Byam | Aug. 4, 1953 |
| 2,766,350 | Gres | Oct. 9, 1956 |